(No Model.)

G. BOHNER.
CRUSHED FRUIT DISH.

No. 599,651. Patented Feb. 22, 1898.

Attest:
M. H. Holmes
James Lavallier

Inventor:
George Bohner,
by Robert Burns
Atty.

UNITED STATES PATENT OFFICE.

GEORGE BOHNER, OF CHICAGO, ILLINOIS.

CRUSHED-FRUIT DISH.

SPECIFICATION forming part of Letters Patent No. 599,651, dated February 22, 1898.

Application filed April 10, 1897. Serial No. 631,589. (No model.)

*To all whom it may concern:*

Be it known that I, GEORGE BOHNER, a citizen of the United States, residing at Chicago, in the county of Cook and State of Illinois, have invented a certain new and useful Improvement in Crushed-Fruit Dishes; and I do hereby declare the following to be a full, clear, and exact description of the same, reference being had to the accompanying drawings, forming a part of this specification.

The present invention relates to that class of covered glass dishes or bowls intended to contain crushed fruits for soda-fountains and like uses and which heretofore have been formed with a notch or orifice in the margin or edge of either the dish or cover to receive and support the stem or handle of the spoon or ladle by which the contents of the dish was removed. With such usual construction as heretofore employed a very serious defect existed in that insects, dust, and the like gained access to the crushed fruits through the notch or orifice for the spoon or ladle handle above described and thus contaminated and in a measure rendered the crushed fruit unfit for use. The present improvement accordingly has for its object to provide a very simple and efficient means for supporting the spoon within the interior of the covered fruit-dish without the necessity of any exposed opening through either the dish or cover through which insects and the like could gain access to the contents of the dish, as will hereinafter more fully appear and be more particularly pointed out in the claims. I attain such objects by the construction and arrangement of parts illustrated in the accompanying drawings, in which—

Figure 1:
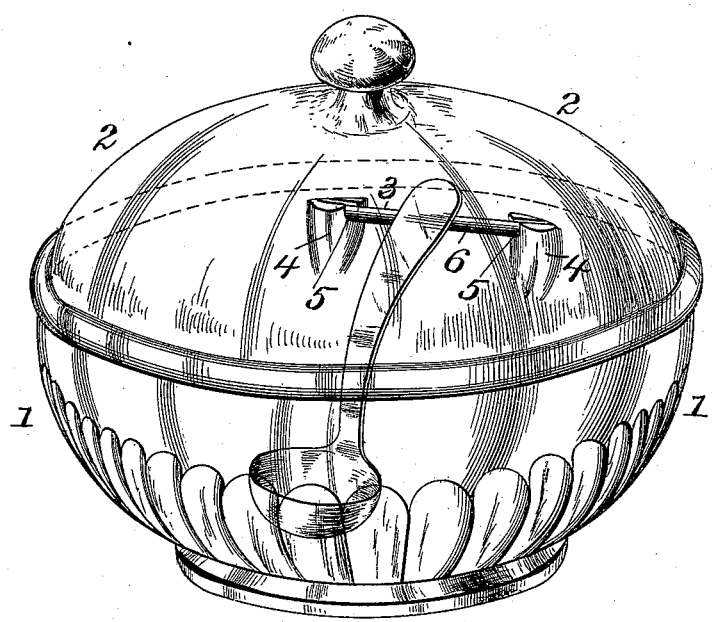
Figure 2:
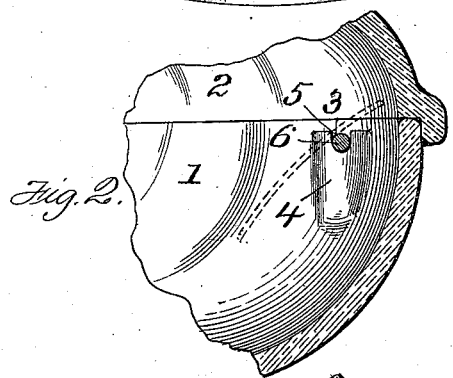
Figure 3:
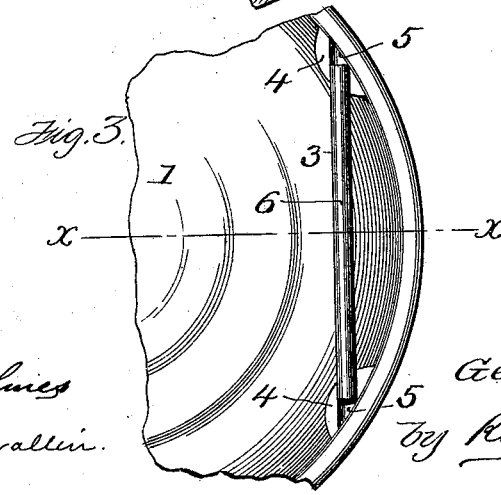

Figure 1 is a perspective view of a crushed-fruit dish embodying the present invention; Fig. 2, a detail sectional elevation at line *x x*, Fig. 3; Fig. 3, a detail plan view of the dish proper, illustrating the arrangement of the present invention.

Similar numerals of reference indicate like parts in the different views.

Referring to the drawings, 1 represents the crushed-fruit dish, of glass or other usual material and having any usual form and ornamental configuration, and 2 the cover therefor, of either glass, metal, or other usual material.

The support 3, by which the stem or handle of the spoon or ladle is supported in proper position within the fruit-bowl, will in the present improvement consist of a removable bar or bridge-piece 6, which is attached to the inner wall of the fruit-bowl in any usual manner that will admit of the ready detachment of such supporting-bar or bridge-piece when it is desired to clean the bowl. In the construction shown in the drawings such attachment of the aforesaid removable supporting-bar or bridge-piece 6 is attained in a very simple and effective manner by means of a pair of oppositely-arranged bosses or protuberances 4 on the inner surface of the bowl, which bosses 4 are formed with open-topped recesses 5 to receive the respective ends of the supporting-bar or bridge-piece 6.

A material feature of the present improvement lies in the arrangement of the supporting-bar or bridge-piece 6 a short distance removed from the margin of the fruit-bowl, so that such bar will constitute a secant to the curved wall of the fruit-bowl, as shown. The main advantage or merit in the above-described arrangement of such supporting-bar is that such bar as so arranged does not offer any impediment to a ready access to the whole contents of the fruit-bowl, while at the same time it affords an effective means for supporting the spoon or ladle wholly within the interior of the bowl when not in actual use, another advantage of such arrangement being that a comparatively shallow cover can be employed in the present type of crushed-fruit bowls, in which the spoon or ladle is inclosed within the bowl when not in actual use.

Having thus fully described my said invention, what I claim as new, and desire to secure by Letters Patent, is—

1. A bowl for crushed fruit and the like provided with a continuous rim, a cover fitting the same, and a supporting-bar or bridge-piece for the handle of the spoon or ladle, said bar or piece being arranged within the interior of the bowl in a position to form a secant to the curved wall of the bowl, substantially as described and for the purpose set forth.

2. A bowl for crushed fruit and the like provided with a continuous rim, a cover fitting the same, and a supporting-bar or bridge-piece for the handle of the spoon or ladle, the said bar being removably attached to the side walls of the bowl, and arranged to form a secant to the same, substantially as described and for the purpose set forth.

3. A bowl for crushed fruit and the like provided with a continuous rim, and with recessed bosses on its inner wall, a cover fitting said bowl, and a supporting-bar or bridge-piece fitting said recessed bosses in a removable manner, substantially as described and for the purpose set forth.

In testimony whereof witness my hand this 7th day of April, 1897.

GEORGE BOHNER.

In presence of—
ROBERT BURNS,
JAMES LAVALLIN.